United States Patent
Wang et al.

(10) Patent No.: US 9,954,662 B2
(45) Date of Patent: Apr. 24, 2018

(54) BOARD, WIRELESS COMMUNICATIONS SYSTEM, AND METHOD FOR CHANNEL CORRECTION INSIDE OR OUTSIDE BOARD

(71) Applicant: Huawei Technologies Co., Ltd., Shenzhen (CN)

(72) Inventors: Bin Wang, Hangzhou (CN); Yuqing Zhao, Hangzhou (CN); Huailin Wen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 15/148,932

(22) Filed: May 6, 2016

(65) Prior Publication Data
US 2016/0254890 A1 Sep. 1, 2016

Related U.S. Application Data

(63) Continuation of application No. PCT/CN2013/086757, filed on Nov. 8, 2013.

(51) Int. Cl.
*H04L 1/00* (2006.01)
*H04L 5/00* (2006.01)
(Continued)

(52) U.S. Cl.
CPC ......... *H04L 5/0048* (2013.01); *H04B 7/0413* (2013.01); *H04L 12/422* (2013.01); *H04W 88/08* (2013.01)

(58) Field of Classification Search
CPC ...... H04J 1/12; H04J 3/10; H04B 3/32; H04B 3/34; H04B 3/487; H04B 17/00;
(Continued)

(56) References Cited

U.S. PATENT DOCUMENTS 8,260,234 B2 * 9/2012 Chae .................. H04B 17/00
455/115.1
8,428,529 B2 * 4/2013 Dakshinamurthy . H01Q 3/2647
455/139
(Continued)

FOREIGN PATENT DOCUMENTS

| CN | 1571549 A | 1/2005 |
| CN | 1852275 A | 10/2006 |
| CN | 203012704 U | 6/2013 |

*Primary Examiner* — Dady Chery
(74) *Attorney, Agent, or Firm* — Leydig, Voit & Mayer, Ltd.

(57) ABSTRACT

A board includes: a baseband unit, multiple transmitters, multiple receivers, a multi-antenna array, a correction transceiver, a correction calculation unit, a bidirectional coupler, and a combiner-splitter. The bidirectional coupler is configured to couple radio frequency signals output by the multiple transmitters and then transmit the coupled radio frequency signals to the combiner-splitter, and to couple receiver correction reference signals obtained by performing division by the combiner-splitter and then send the coupled receiver correction reference signals to the multiple receivers; and the combiner-splitter is configured to combine transmitter radio frequency signals coupled by the bidirectional coupler and then transmit the combined transmitter radio frequency signals to the correction transceiver, and to divide a receiver correction reference signal sent by the correction transceiver and then send receiver correction reference signals obtained by performing division to the coupler. Accuracy of channel reciprocity correction of a transmitter and a receiver can be ensured.

20 Claims, 9 Drawing Sheets

(51) Int. Cl.
*H04W 88/08* (2009.01)
*H04B 7/0413* (2017.01)
*H04L 12/42* (2006.01)

(58) Field of Classification Search
CPC ........ H04Q 2011/0049; H04Q 2201/14; H04L 47/70; H04L 47/72; H04L 47/74; H04L 47/78; H04L 47/80; H04L 2012/5625; H04L 43/10; H04L 43/50
USPC ............ 370/201, 230, 241.1, 242, 329, 241; 375/219–222, 267, 347, 349, 299
See application file for complete search history.

(56) References Cited

U.S. PATENT DOCUMENTS

| | | | |
|---|---|---|---|
| 2009/0046003 A1* | 2/2009 | Tung | H04B 7/0413 342/174 |
| 2011/0103495 A1 | 5/2011 | Hall | |
| 2012/0020392 A1 | 1/2012 | O'Keeffe et al. | |
| 2016/0094332 A1* | 3/2016 | Griffiths | H04B 1/109 370/278 |

* cited by examiner

BOARD, WIRELESS COMMUNICATIONS SYSTEM, AND METHOD FOR CHANNEL CORRECTION INSIDE OR OUTSIDE BOARD

CROSS-REFERENCE

This application is a continuation of International Patent Application No. PCT/CN2013/086757, filed Nov. 8, 2013, which is hereby incorporated by reference in its entirety.

TECHNICAL FIELD

The present disclosure relates to the field of wireless communications, and in particular, to a board, a wireless communications system, and a method for channel correction inside or outside a board.

BACKGROUND

The MIMO (Multiple-Input Multiple-Out-put) technology is first put forward by Marconi in 1908. A wireless communications system may use the MIMO technology to receive and send a signal. The MIMO technology comprehensively utilizes information about a wireless channel, such as a coverage area, a spectrum utilization, and a channel capacity. A next-generation wireless broadband mobile communications system uses the MIMO technology, that is, multiple antennas are disposed at an end of a base station, multiple antennas are also disposed at a mobile station, and an MIMO communication link is formed between the base station and the mobile station.

At a transmit end or a receive end of an actual MIMO system, transmission from a baseband to an antenna port passes through a related radio frequency circuit, causing inconsistency of amplitudes, phases, and delays between channels of antennas, which severely reduces an actual effect of MIMO transmission. Therefore, in the MIMO system, transmit channel correction and receive channel correction of a device need to be performed. Similarly, in the MIMO system, reciprocity correction of a transmit channel and a receive channel also needs to be performed, that is, difference correction of amplitudes, phases, and delays of the transmit channel and the receive channel. An objective of all the channel correction is to enable amplitudes, phases, and delays of transmit channels, or of receive channels, or of a transmit channel and a receive channel to keep consistent between each other.

FIG. 1a is a structural block diagram for existing correction inside a board of a transmit channel and a receive channel. As shown in FIG. 1a, a structure of correction inside a board in the prior art may include: a baseband unit 10, transmitters 12, receivers 13, a directional coupler 14 and a directional coupler 15, a combiner 16, a splitter 17, a correction transceiver 18, a correction calculation unit 19, and a multi-antenna array 11.

When a device transmits a service signal, after being processed by the baseband unit 10, the service signal is fed into a corresponding transmitter 12. The transmitter 12 converts a baseband signal into an analog radio frequency signal, and the analog radio frequency signal is transmitted to wireless space by using the multi-antenna array 20. Meanwhile, the directional coupler 15 couples some transmit signals output by the transmitters 12 at each antenna port, and after being combined by the multi-port combiner 16, the transmit signals are fed into the correction transceiver 18 and are forwarded to the correction calculation unit 19 by the correction transceiver 18. In this way, the correction calculation unit 19 can calculate to obtain differences of amplitudes, phases, and delays between transmit channels of the transmitters 12, the differences are finally fed back to the baseband unit 10 by the correction calculation unit 19, and the baseband unit 10 adjusts, according to a feature of the differences calculated by the correction calculation unit 19, an amplitude, a phase, and a delay of each antenna, so as to finally enable amplitudes, phases, and delays of signals transmitted at antenna ports to keep consistent.

Similarly, when a device receives a service signal, the multi-antenna array 11 receives a wireless service signal from the wireless space, and a receive channel of a receiver 13 converts a radio frequency analog signal into a normal service baseband signal and sends the normal service baseband signal to the baseband unit 10. Meanwhile, the correction transceiver 18 sends a receiver correction reference signal, the receiver correction reference signal is divided by the multi-port divider 17 into multiple same correction reference signals, then some correction reference signals are coupled by the directional coupler 15 at each antenna port and fed into each receiver 13, and the baseband unit 10 sends the coupled correction reference signals output by receivers 13 to the correction calculation unit 19. The correction calculation unit 19 calculates according to the correction reference signals output by the receivers 13 to obtain differences of amplitudes, phases, and delays between receive channels of the receivers 13, the differences are finally fed back to the baseband unit 10, and the baseband unit adjusts, according to a feature of the differences calculated by the correction calculation unit 19, an amplitude, a phase, and a delay of each receive antenna, so as to finally enable amplitudes, phases, and delays of signals received by the antenna ports to keep consistent after the signals pass through radio frequency channels.

It can be known from FIG. 1a that, in the foregoing structure, when transmit channel correction of transmitters is performed inside a board, signals of the transmitters are processed by using a channel on which the directional coupler 14 and the combiner 16 are located; while when receive channel correction of receivers is performed, a receiver correction reference signal of the correction transceiver is processed by using a channel on which the divider 17 and the directional coupler 15 are located. However, in an existing system, accuracy of channel reciprocity correction of a transmitter and a receiver is not high. Reciprocity refers to that, when locations of input and specific output of a network are exchanged, the output is not changed because of this type of location exchange.

SUMMARY

In view of this, the present disclosure provides a board, a wireless communications system, and a method for channel correction inside or outside a board, which can improve accuracy of channel reciprocity correction of a transmitter and a receiver.

According to an aspect of the present disclosure, a board is provided, which may include: a baseband unit, multiple transmitters, multiple receivers, a multi-antenna array, a correction transceiver, and a correction calculation unit, where the board further includes: a bidirectional coupler and a combiner-splitter, where the bidirectional coupler is separately connected to the multiple transmitters, the multiple receivers and the combiner-splitter, and configured to couple radio frequency signals output by the multiple transmitters and then transmit the coupled radio frequency signals to the combiner-splitter, and to couple receiver correction reference signals obtained by performing division by the combiner-splitter and then send the coupled receiver correction reference signals to the multiple receivers; and the combiner-splitter is separately connected to the bidirectional coupler and the correction transceiver, and configured to combine transmitter radio frequency signals coupled by the bidirectional coupler and then transmit the combined transmitter radio frequency signals to the correction transceiver, and to divide a receiver correction reference signal sent by the correction transceiver and then send receiver correction reference signals obtained by performing division to the bidirectional coupler.

With reference to the first aspect, in a first feasible implementation manner, the board further includes:

a service data interface, configured to connect the board and a central data processing unit; and a cascade port, configured to cascade the board and other boards on the central data processing unit to form a ring-shaped topology.

With reference to the first feasible implementation manner of the first aspect, in a second feasible implementation manner, the cascade port includes:

two cascade ports, separately connected to cascade ports of an upper level board and a lower level board in the ring-shaped topology; and the board further includes:

a switch unit, configured to control connection/disconnection of a path between the combiner-splitter and the correction transceiver; control connection/disconnection of a cascade port, cascaded to the upper level board, of the board, where the cascade port cascaded to the upper level board is configured to send a receiver reference correction signal to the upper level board or to receive a transmitter radio frequency signal from the upper level board; and control connection/disconnection of a cascade port, cascaded to the lower level board, of the board, where the cascade port cascaded to the lower level board is configured to send a transmitter radio frequency signal of the board to the lower level board or to receive a receiver reference correction signal from the lower level board.

With reference to the second feasible implementation manner of the first aspect, in a third feasible implementation manner, the two cascade ports are connected to the cascade ports of the upper level board and the lower level board by using a radio frequency cable.

According to a second aspect of embodiments of the present disclosure, a wireless communications system is provided, which may include a central data processing unit and at least one board connected to the central data processing unit, where the board is the board according to any embodiment of the embodiments of the present disclosure, and the at least one board performs data communication with the central data processing unit by using a service data interface.

According to a third aspect of the embodiments of the present disclosure, a method for channel correction inside a board is provided, which may be applied to the board according to any embodiment of the present disclosure, where the method may include:

calculating, by a correction calculation unit, according to coupled transmitter radio frequency signals, an amplitude difference, a phase difference and a delay difference between transmit channels of multiple transmitters inside the board, and sending a calculation result to a baseband unit inside the board to perform transmit channel correction inside the board, where the coupled transmitter radio frequency signal is a signal that arrives at the correction calculation unit after radio frequency signals output by the multiple transmitters of the board are successively coupled by the bidirectional coupler, combined by the combiner-splitter, and forwarded by the correction transceiver;

calculating, by the correction calculation unit, according to coupled receiver reference correction signals, an amplitude difference, a phase difference and a delay difference between receive channels of multiple receivers inside the board, and sending a calculation result to the baseband unit to perform receive channel correction inside the board, where the coupled receiver reference correction signal is a signal that is output by the multiple receivers after a reference correction signal output by the correction transceiver inside the board is successively divided by the combiner-splitter, and coupled by the bidirectional coupler; and when the transmit channel correction and the receive channel correction are completed, calculating, by the correction calculation unit, an amplitude difference, a phase difference and a delay difference between channels of any transmitter and any receiver, and sending a calculation result to the baseband unit to perform channel reciprocity correction of the transmitter and the receiver inside the board.

According to a fourth aspect of the embodiments of the present disclosure, a method for transmit channel correction between boards in a wireless communications system is provided, where the wireless communications system includes a central data processing unit and at least one board connected to the central data processing unit, the board is the board according to any embodiment of the embodiments of the present disclosure, the board performs data communication with the central data processing unit by using a service data interface, and the method may include:

performing, by the board, transmit channel correction inside the board;

receiving, by the board, coupled transmitter radio frequency signals from an upper level or lower level board of the board;

calculating, by the board according to the coupled transmitter radio frequency signal received from the upper level or lower level board and coupled transmitter radio frequency signals inside the board, an amplitude difference, a phase difference and a delay difference between a transmit channel of the board and a transmit channel of the upper level or lower level board; and correcting, by the board, the transmit channel of the board according to a calculation result, so as to enable an amplitude, a phase and a delay of the transmit channel of the board to keep consistent with an amplitude, a phase and a delay of the transmit channel of the upper level or lower level board respectively.

With reference to the fourth aspect, in a first feasible implementation manner, the receiving, by the board, coupled transmitter radio frequency signals from an upper level or lower level board of the board includes:

conducting, by a switch unit inside the board, a path on which a cascade port, cascaded to the upper level or lower level board, of the board is located, and receiving the coupled transmitter radio frequency signal from the upper level or lower level board by using the conducted cascade port.

With reference to the first feasible implementation manner of the fourth aspect, in a second feasible implementation manner, the calculating, by the board according to the coupled transmitter radio frequency signal received from the upper level or lower level board and coupled transmitter radio frequency signals inside the board, an amplitude difference, a phase difference and a delay difference between a transmit channel of the board and a transmit channel of the upper level or lower level board includes:

receiving, by a correction calculation unit of the board from the cascade port conducted by the switch unit, the coupled transmitter radio frequency signal of the upper level or lower level board by using a correction transceiver of the board; and calculating, by the correction calculation unit of the board, the amplitude difference, the phase difference and the delay difference between the transmit channel of the board and the transmit channel of the upper level or lower level board.

With reference to the second feasible implementation manner of the fourth aspect, in a third feasible implementation manner, the correcting, by the board, the transmit channel of the board according to a calculation result includes:

correcting, by a baseband unit of the board, the transmit channel of the board according to the calculation result of the correction calculation unit of the board.

With reference to any one of the fourth aspect to the third feasible implementation manner of the fourth aspect, in a fourth feasible implementation manner, after the correcting, by the board, the transmit channel of the board according to a calculation result, the method further includes:

sending, by the board, the coupled transmitter radio frequency signals to the upper level or lower level board connected to the board.

With reference to the fourth feasible implementation manner of the fourth aspect, in a fifth feasible implementation manner, the sending, by the board, coupled transmitter radio frequency signals to the upper level or lower level board connected to the board includes:

conducting, by the switch unit of the board, the path on which the cascade port, cascaded to the upper level or lower level board, of the board is located, and sending the coupled transmitter radio frequency signal of the board to the upper level or lower level board by using the conducted cascade port.

According to a fifth aspect of the embodiments of the present disclosure, a method for receive channel correction between boards in a wireless communications system is provided, where the wireless communications system includes a central data processing unit and at least one board connected to the central data processing unit, the board is the board according to any embodiment of the embodiments of the present disclosure, the board performs data communication with the central data processing unit by using a service data interface, and the method includes:

performing, by the board, receiver channel correction inside the board;

receiving, by the board, a receiver correction reference signal from an upper level or lower level board connected to the board;

calculating, by the board according to the receiver correction reference signal received from the upper level or lower level board, an amplitude, a phase and a delay of a receive channel of any receiver of the board;

receiving, by the board from the upper level or lower level board, an amplitude, a phase and a delay, which are based on the receiver correction reference signal, of a receive channel of a receiver of the upper level or lower level board;

calculating, by the board, an amplitude difference, a phase difference and a delay difference between a receive channel of any receiver of the board and the receive channel of the upper level or lower level board; and correcting, by the board, the amplitude, the phase and the delay of the receiver channel of the board according to the calculated differences, so as to keep consistent with the amplitude, the phase and the delay of the receive channel of the receiver of the upper level or lower level board.

With reference to the fifth aspect, in a first feasible implementation manner, the receiving, by the board, a receiver correction reference signal from an upper level or lower level board connected to the board includes:

conducting, by a switch unit inside the board, a path on which a cascade port, cascaded to the upper level or lower level board, of the board is located, and receiving the receiver correction reference signal from the upper level or lower level board by using the conducted cascade port.

With reference to the first feasible implementation manner of the fifth aspect, in a second feasible implementation manner, the calculating, by the board according to the receiver correction reference signal received from the upper level or lower level board, an amplitude, a phase and a delay of a receive channel of any receiver of the board includes:

calculating, by a correction calculation unit of the board according to coupled receiver correction reference signals received by a baseband unit of the board from any receiver of the board, the amplitude, the phase and the delay of the receiver channel of the board, where the receiver correction reference signals are received from the upper level or lower level board.

With reference to the second feasible implementation manner of the fifth aspect, in a third feasible implementation manner, the receiving, by the board from the upper level or lower level board, an amplitude, a phase and a delay, which are based on the receiver correction reference signal, of a receive channel of a receiver of the upper level or lower level board includes:

receiving, by the board from the upper level or lower level board by using the central data processing unit, the amplitude, the phase and the delay, which are based on the receiver correction reference signal, of the receiver channel of the upper level or lower level board.

With reference to the third feasible implementation manner of the fifth aspect, in a fourth feasible implementation manner, the calculating, by the board, an amplitude difference, a phase difference and a delay difference between a receive channel of any receiver of the board and the receive channel of the upper level or lower level board includes:

calculating, by the correction calculation unit of the board, the amplitude difference, the phase difference and the delay difference between the receive channel of any receiver of the board and the receive channel of the upper level or lower level board.

With reference to the fourth feasible implementation manner of the fifth aspect, in a fifth feasible implementation manner, the correcting, by the board, the amplitude, the phase and the delay of the receiver channel of the board according to the calculated differences, so as to keep consistent with the amplitude, the phase and the delay of the receive channel of the receiver of the upper level or lower level board includes:

correcting, by the baseband unit of the board, the amplitude, the phase and the delay of the receiver channel of the board according to the calculated differences, so as to keep consistent with the amplitude, the phase and the delay of the receive channel of the receiver of the upper level or lower level board.

With reference to any one of the fifth aspect to the fifth feasible implementation manner of the fifth aspect, in a sixth feasible implementation manner, after the correcting, by the board, the amplitude, the phase and the delay of the receiver channel of the board according to the calculated differences, the method further includes:

sending, by the board, a receiver correction reference signal to the upper level or lower level board connected to the board.

With reference to the sixth feasible implementation manner of the fifth aspect, in a seventh feasible implementation manner, the sending, by the board, a receiver correction reference signal to the upper level or lower level board connected to the board includes:

conducting, by the switch unit of the board, the path on which the cascade port, cascaded to the upper level or lower level board, of the board is located, and sending the receiver correction reference signal to the upper level or lower level board by using the conducted cascade port.

It can be learned from the foregoing descriptions that in some feasible implementation manners of the present disclosure, one bidirectional coupler and one combiner-splitter are used to couple transmit signals of transmit channels of transmitters and receive signals of receive channels of receivers. Compared with the prior art, the present disclosure improves reciprocity of two links for receive correction and transmit correction because the two links use same devices, that is, amplitude and phase losses introduced by measurement links of channels of receive correction and transmit correction can offset each other to the greatest degree. That is, in the implementation manners of the present disclosure, consistency of devices for channel correction of transmit channels of transmitters and receive channels of receivers is ensured, accuracy of channel reciprocity correction of the transmitter and the receiver is improved, and processing efficiency of a system is improved.

DESCRIPTION OF EMBODIMENTS

The present disclosure is described in detail below by using specific embodiments.

Figure 2:
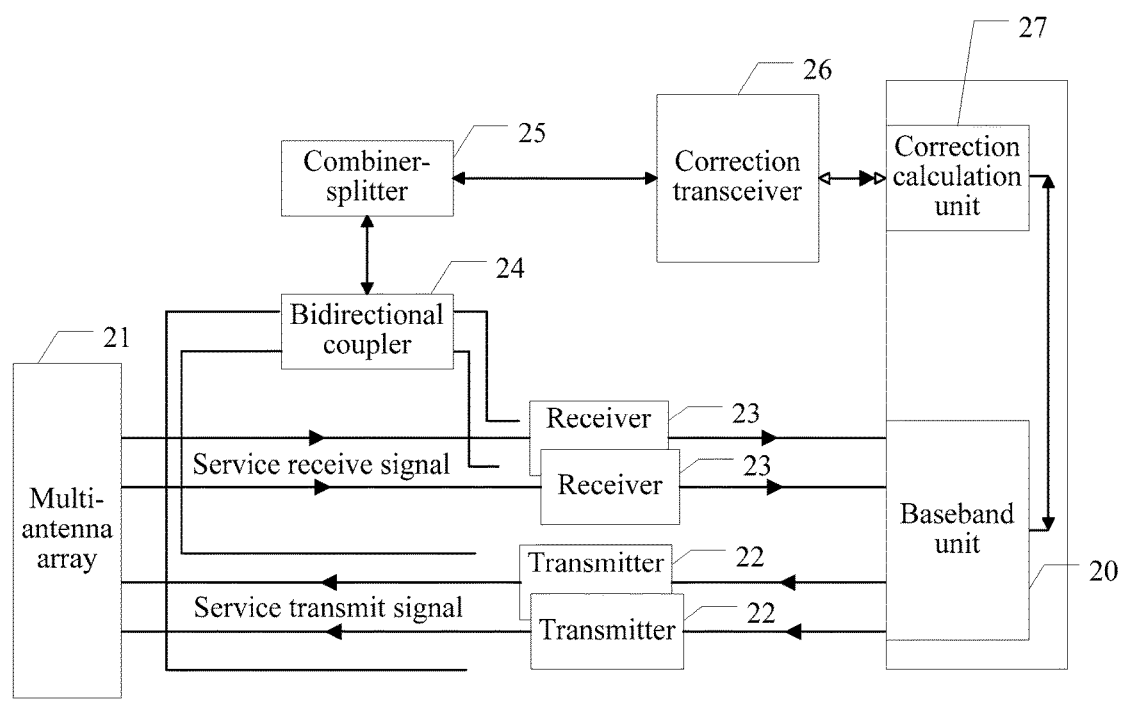
FIG. 2 is a schematic diagram of structural composition of an embodiment of a board according to the present disclosure.

FIG. 2 is a schematic diagram of structural composition of an embodiment of a board according to the present disclosure. As shown in FIG. 2, the board may include: a baseband unit 20, a multi-antenna array 21, transmitters 22, receivers 23, a bidirectional coupler 24, a combiner-splitter 25, a correction transceiver 26, and a correction calculation unit 27.

The baseband unit 20 is separately connected to the transmitters 22, the receivers 23 and the correction calculation unit 27, and is configured to receive a baseband signal from the receiver 23 and send the baseband signal to the transmitter 22, and to receive a receiver correction reference signal from the receiver 23 and forward the receiver correction reference signal to the correction calculation unit 27.

The multi-antenna array 21 is separately connected to the transmitters 22 and the receivers 23, and is configured to receive a radio frequency signal from wireless space and forward the radio frequency signal to the receiver 23 that receives the radio frequency signal, and to receive a transmit radio frequency signal from the transmitter 22 and transmit the transmit radio frequency signal to the wireless space.

The transmitter 22 is separately connected to the baseband unit 20, the multi-antenna array 21 and the bidirectional coupler 24, and is configured to receive a baseband signal from the baseband unit 20 and convert the baseband signal into a radio frequency signal, and to send the radio frequency signal to the multi-antenna array 21 and the bidirectional coupler 24.

The receiver 23 is separately connected to the baseband unit 20, the multi-antenna array 21 and the bidirectional coupler 24, and is configured to receive a radio frequency signal of the wireless space from the multi-antenna array 21 and convert the radio frequency signal into a baseband signal and send the baseband signal to the baseband unit 20, and to receive coupled receiver reference signals from the bidirectional coupler 24 and send the coupled receiver reference signals to the baseband unit 20.

The bidirectional coupler 24 is separately connected to the transmitters 22, the receivers 23 and the combiner-splitter 25, and is configured to couple radio frequency signals sent by the transmitters 22 and then send the coupled radio frequency signals to the combiner-splitter 25, and to couple receiver reference correction signals obtained by performing division by the combiner-splitter 25 and then send the coupled receiver reference correction signals to the receivers 23.

The combiner-splitter 25 is separately connected to the bidirectional coupler 24 and the correction transceiver 26, and is configured to combine coupled transmitter radio frequency signals sent by the bidirectional coupler 24 and then send the combined transmitter radio frequency signals to the correction transceiver 26, and to divide a receiver correction reference signal sent by the correction transceiver 26 and then send receiver correction reference signals obtained by performing division to the bidirectional coupler 24.

The correction transceiver 26 is separately connected to the combiner-splitter 25 and the correction calculation unit 27, and is configured to forward the transmitter radio frequency signals combined by the combiner-splitter 25 to the correction calculation unit 27, and to send a receive correction reference signal to the combiner-splitter 25.

The correction calculation unit 27 is separately connected to the correction transceiver 26 and the baseband unit 20, and is configured to calculate, according to the coupled transmitter radio frequency signals forwarded by the correction transceiver 26, an amplitude difference, a phase difference and a delay difference between transmit channels of the multiple transmitters 22, and send a calculation result to the baseband unit 20 to perform transmit channel correction of the transmitters inside the board; and calculate, according to the coupled receiver reference correction signals output by the multiple receivers 23, an amplitude difference, a phase difference and a delay difference between receive channels of the multiple receivers 23, and send a calculation result to the baseband unit 20 to perform receiver channel correction inside the board.

Connection described in this application refers to communication connection, including direct or indirect connection.

In an architecture of the embodiment shown in FIG. 2, when a device transmits a service signal, after being processed by the baseband unit 20, the service signal is fed into a corresponding transmitter 22. The transmitter 22 converts a baseband signal into an analog radio frequency signal, and the analog radio frequency signal is transmitted to wireless space by using the multi-antenna array 21. Meanwhile, the bidirectional coupler 24 couples some radio frequency signals output by transmitters 22 at each antenna port, and after being combined by the multi-port combiner-splitter 25, the radio frequency signals are fed into the correction transceiver 26 and are forwarded to the correction calculation unit 27 by the correction transceiver 26. In this way, the correction calculation unit 27 can calculate to obtain differences of amplitudes, phases, and delays between transmit channels of the transmitters 22, the differences are finally fed back to the baseband unit 20 by the correction calculation unit 22, and the baseband unit 20 adjusts, according to a feature of the differences calculated by the correction calculation unit 20, an amplitude, a phase, and a delay of each antenna, so as to finally enable amplitudes, phases, and delays of signals transmitted at the antenna ports to keep consistent.

Similarly, when the device receives a service signal, the multi-antenna array 21 receives a wireless service signal from the wireless space, a receive channel of the receiver 23 converts a radio frequency analog signal into a normal service baseband signal and sends the normal service baseband signal to the baseband unit 20. Meanwhile, the correction transceiver 26 sends a receiver correction reference signal, the receiver correction reference signal is divided by the multi-port combiner-splitter 25 into multiple same correction reference signals, then some correction reference signals are coupled by the bidirectional coupler 24 at each antenna port and fed into each receiver 23, and the baseband unit 20 sends the coupled correction reference signals output by receivers 23 to the correction calculation unit 27. The correction calculation unit 27 calculates according to the correction reference signals output by the receivers 23 to obtain differences of amplitudes, phases, and delays between receive channels of the receivers 23, the differences are finally fed back to the baseband unit 20, and the baseband unit 20 adjusts, according to a feature of the differences calculated by the correction calculation unit 27, an amplitude, a phase, and a delay of each receive antenna, so as to finally enable amplitudes, phases, and delays of signals received by the antenna ports to keep consistent after the signals pass through radio frequency channels.

When the transmit channel correction and the receive channel correction are completed, the correction calculation unit 27 may randomly select a transmit channel of a transmitter and randomly select a receive channel of a receiver, calculate an amplitude difference, a phase difference and a delay difference between the randomly selected channels of the transmitter and the receiver, and send a calculation result to the baseband unit 20 to perform channel reciprocity correction of the transmitter and the receiver inside the board.

Figure 1A:
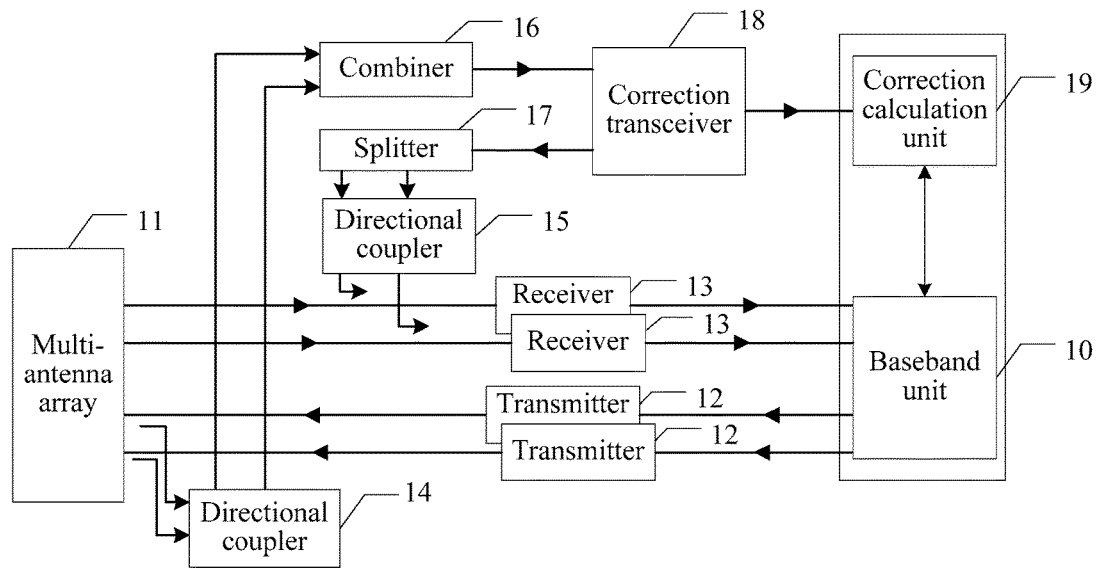
FIG. 1a is a schematic diagram of structural composition of an existing board.

It can be known by comparing the system shown in FIG. 2 with the system of FIG. 1*a* that, in the structure shown in FIG. 1, when transmit channel correction of transmitters is performed inside a board, signals of the transmitters are processed by using a channel on which a directional coupler 14 and a combiner 16 are located; while when receive channel correction of receivers is performed, a receiver correction reference signal of a correction transceiver is processed by using a channel on which a splitter 17 and a directional coupler 15 are located. In this way, a result of receive and transmit reciprocity correction in the system shown in FIG. 1*a* is not accurate. However, in the system shown in FIG. 2, a bidirectional coupler 24 and a combiner-splitter 25 are configured to couple transmit signals of transmit channels of transmitters and receive signals of receive channels of receivers, so that consistency of devices for channel correction of the transmit channels of the transmitters and the receive channels of the receivers is ensured, thereby improving accuracy of channel reciprocity correction of the transmitters and the receivers.

Figure 3:
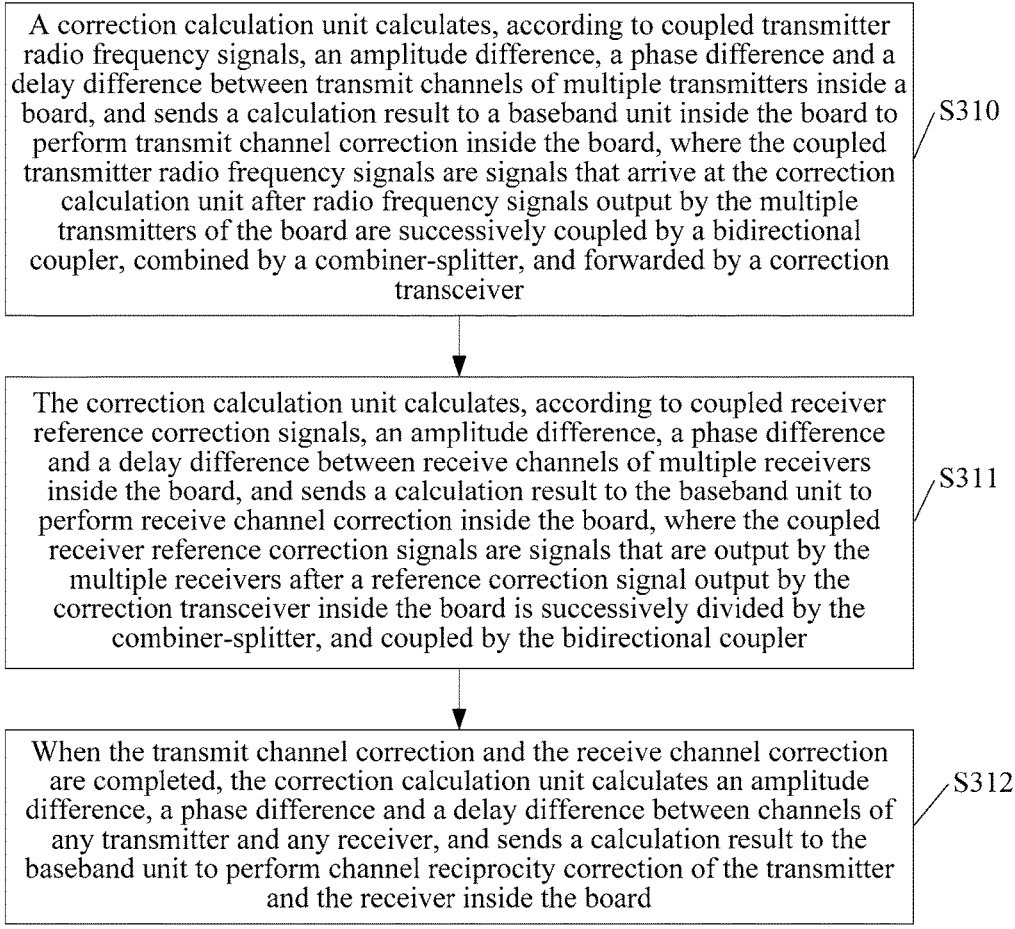
FIG. 3 is a schematic flowchart of an embodiment of a method for channel correction inside a board according to the present disclosure.

Further, as shown in FIG. 3, based on an architecture of the board in FIG. 2, an embodiment of the present disclosure provides a method for channel correction inside a board. The method may include:

Step S310: A correction calculation unit calculates, according to coupled transmitter radio frequency signals, an amplitude difference, a phase difference and a delay difference between transmit channels of multiple transmitters inside the board, and sends a calculation result to a baseband unit inside the board to perform transmit channel correction inside the board, where the coupled transmitter radio frequency signals are signals that arrive at the correction calculation unit after radio frequency signals output by the multiple transmitters of the board are successively coupled by a bidirectional coupler, combined by a combiner-splitter, and forwarded by a correction transceiver.

Step S311: The correction calculation unit calculates, according to coupled receiver reference correction signals, an amplitude difference, a phase difference and a delay difference between receive channels of multiple receivers inside the board, and sends a calculation result to the baseband unit to perform receive channel correction inside the board, where the coupled receiver reference correction signals are signals that are output by the multiple receivers after a reference correction signal output by the correction transceiver inside the board is successively divided by the combiner-splitter, and coupled by the bidirectional coupler.

Step S312: When the transmit channel correction and the receive channel correction are completed, the correction calculation unit calculates an amplitude difference, a phase difference and a delay difference between channels of any transmitter and any receiver, and sends a calculation result to the baseband unit to perform channel reciprocity correction of the transmitter and the receiver inside the board.

It can be known from FIG. 2 and FIG. 3 that, in this embodiment of the present disclosure, when the board performs transmit channel correction of transmitters and receive channel correction of receivers, a bidirectional operation of the bidirectional coupler and the combiner-splitter in a correction link is used to complete correction in different directions of a same device. Because the bidirectional coupler and the combiner-splitter both work in a bidirectional way, differential losses, phase shifts and delays of the bidirectional coupler and the combiner-splitter are the same in a forward direction and a reverse direction, which therefore may be considered as approximately reciprocal. Therefore, measurement links for performing transmit channel correction and receive channel correction are reciprocal, so that accuracy of channel reciprocity correction of the transmitter and the receiver is ensured or improved.

Figure 1B:
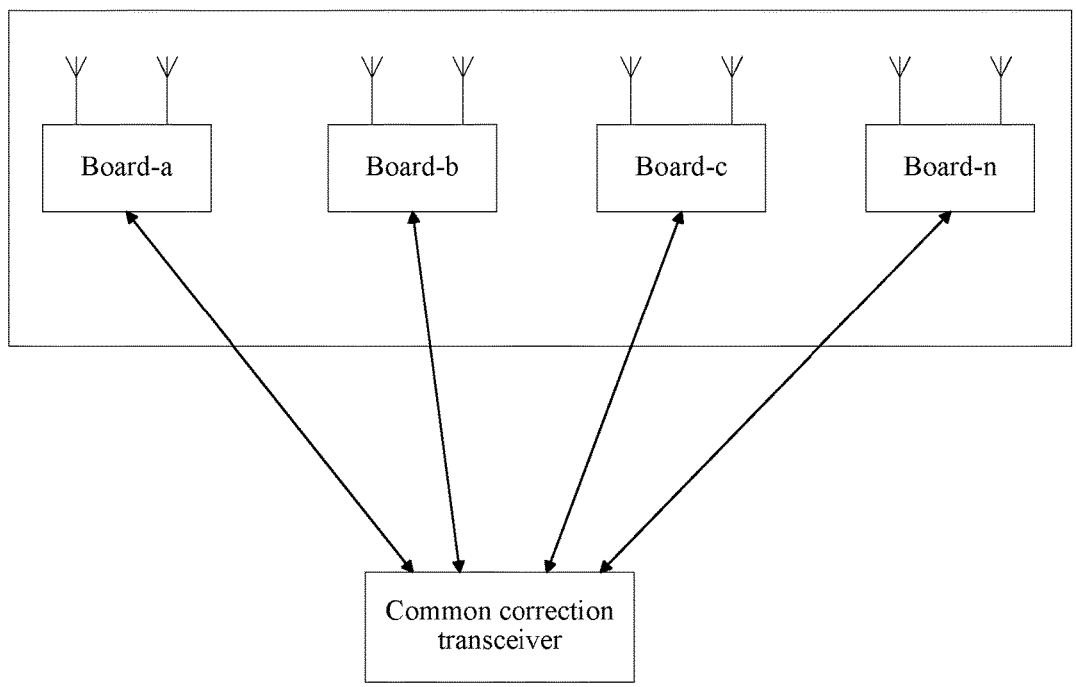
FIG. 1b is a schematic diagram of structural composition of an existing wireless communications system.
Figure 4:
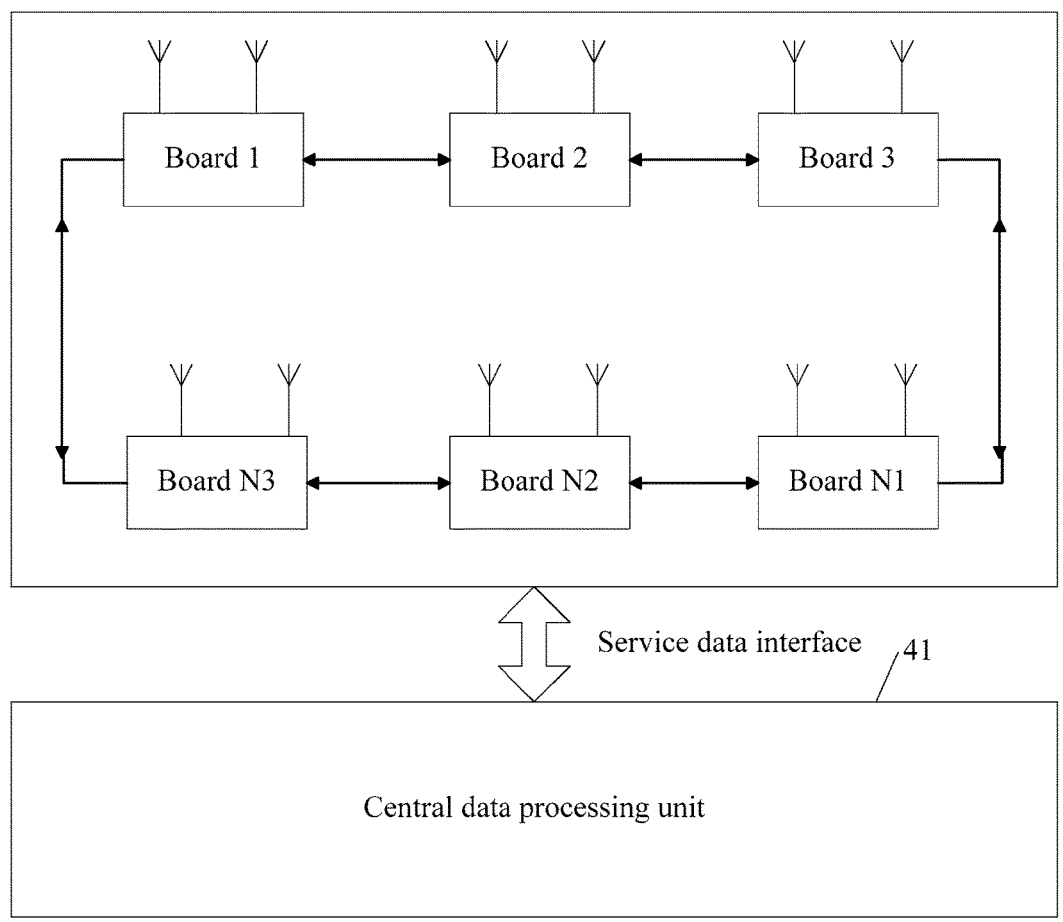
FIG. 4 is a schematic diagram of structural composition of an embodiment of a wireless communications system according to the present disclosure.

In specific implementation, there may be a case in which a quantity of antennas of one board does not meet a requirement for transmitting and receiving. In this case, a case in which multiple boards simultaneously perform data receiving and transmitting occurs in one device. In this way, transmit correction, receive correction and reciprocity correction need to be performed on receive and transmit channels of antennas for all boards. Referring to FIG. 1b, a wireless communications system that includes multiple boards is provided in the prior art. In the wireless communications system, a board a to a board n are all connected to a common correction transceiver, and transmit channel correction and receive channel correction between the boards are performed by using the common correction transceiver. In this architecture, a large quantity of cable interconnection needs to be performed between the boards and the common correction transceiver, increasing system costs. Therefore, an embodiment of the present disclosure further provides a wireless communications system. As shown in FIG. 4, a board 1 to a board N−1 in the wireless communications system provided in this embodiment of the present disclosure form a ring-shaped topology in a cascading manner. Moreover, all boards in the system are all connected to a central data processing unit 41 by using a service data interface, and perform data communication with the central data processing unit 41 by using the service data interface.

Figure 5:
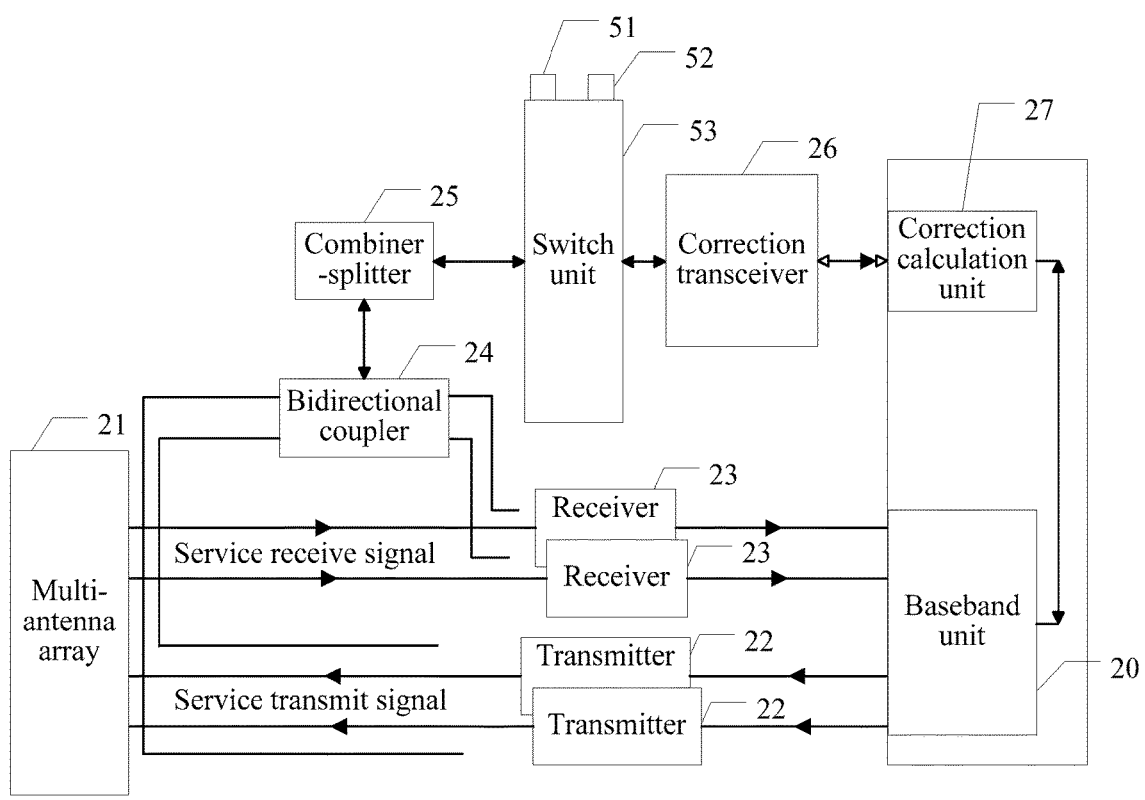
FIG. 5 is a schematic diagram of structural composition of another embodiment of a board according to the present disclosure.

Further, FIG. 5 is a schematic diagram of structural composition of any board in FIG. 4. As shown in FIG. 5 and FIG. 4, when the board is a board in the wireless communications system, for ease of description, a board 1 is used as an example, and on the basis of the embodiment shown in FIG. 2, an internal structure of the board 1 further includes a cascade port that is configured to cascade the board and other boards on the central data processing unit 41 to form a ring-shaped topology. For ease of description, the board 1 in FIG. 5 includes a cascade port 51 and a cascade port 52, which are configured to connect the board 1 and a cascade port of an upper level board N3 and a cascade port of a lower level board 2 in the ring-shaped topology respectively. In specific implementation, the cascade ports of the board 1 may be connected to the cascade ports of the upper level board N3 and the lower level board 2 by using a radio frequency cable. In addition to this, the board in this embodiment of the present disclosure further includes a service data interface that is not drawn in FIG. 5, and the service data interface is configured to connect the board 1 and the central data processing unit 41.

Further, as shown in FIG. 5, the board in the wireless communications system may further include a switch unit 53, configured to control connection/disconnection of a path between the combiner-splitter 25 and the correction transceiver 26; control connection/disconnection of a cascade port 51, cascaded to the upper level board N3, of the board 1, where the cascade port 51 cascaded to the upper level board N3 is configured to send a receiver reference correction signal to the upper level board N3 or to receive a transmitter radio frequency signal from the upper level board N3; and control connection/disconnection of a cascade port 52, cascaded to the lower level board 2, of the board 1, where the cascade port 52 cascaded to the lower level board 2 is configured to send a transmitter radio frequency signal of the board 1 to the lower level board 2 or to receive a receiver reference correction signal from the lower level board 2. In specific implementation, a control signal of the switch unit 53 may come from inside or outside of the board 1.

In FIG. 5, when the switch unit 53 controls the path between the combiner-splitter 25 and the correction transceiver 26 to be conducted, channel correction inside the board can be performed. A correction method for the channel correction is the same as that of FIG. 3, and no further details are provided herein again.

Figure 6:
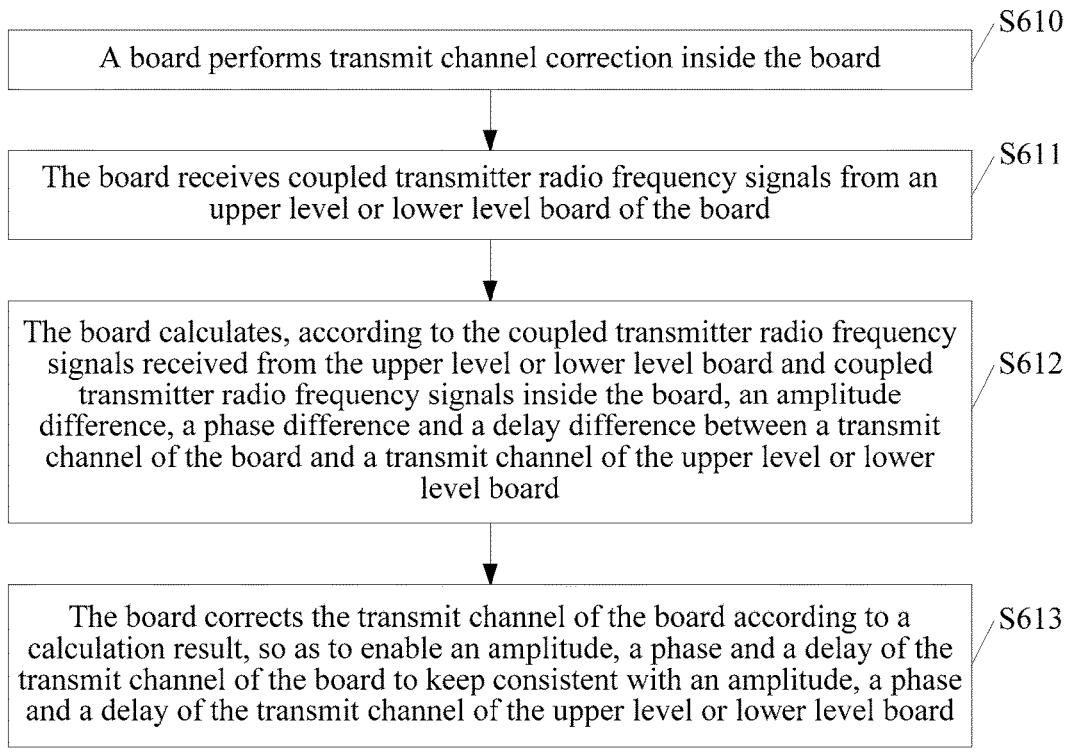
FIG. 6 is a schematic flowchart of an embodiment of a method for transmit channel correction between boards according to the present disclosure.

Further, as shown in FIG. 6, based on architectures of FIG. 4 and FIG. 5, an embodiment of the present disclosure provides a method for transmit channel correction between boards, where the method may be applied to transmit channel correction between any board in the wireless communications system in FIG. 4 and an upper level or lower level board of the board. As shown in FIG. 6, the method may include:

Step S610: The board performs transmit channel correction inside the board.

In specific implementation, for a process in which the board performs transmit channel correction inside the board, refer to word descriptions of the embodiment of FIG. 2 and step S310 in FIG. 3, and no further details are provided herein again.

Step S611: The board receives coupled transmitter radio frequency signals from an upper level or lower level board of the board.

In specific implementation, in step S611, a switch unit inside the board conducts a path on which a cascade port, cascaded to the upper level or lower level board, of the board is located, and receives the coupled transmitter radio frequency signals from the upper level or lower level board by using the conducted cascade port. For example, referring to FIG. 4 and FIG. 5, assuming that the board is a board 1, when the board 1 now needs to perform transmit channel correction with an upper level board N3, in step S611, a switch unit 53 of the board 1 may conduct a cascade port 51, cascaded to the upper level board N3, of the board 1, and receive the coupled transmitter radio frequency signals from the upper level board N3 by using the conducted cascade port 51.

Step S612: The board calculates, according to the coupled transmitter radio frequency signals received from the upper level or lower level board and coupled transmitter radio frequency signals inside the board, an amplitude difference, a phase difference and a delay difference between a transmit channel of the board and a transmit channel of the upper level or lower level board.

In specific implementation, in step S612, a correction calculation unit of the board receives, from the cascade port conducted by the switch unit, the coupled transmitter radio frequency signals of the upper level or lower level board by using a correction transceiver of the board; and the correction calculation unit of the board calculates the amplitude difference, the phase difference and the delay difference between the transmit channel of the board and the transmit channel of the upper level or lower level board. Still referring to FIG. 4 and FIG. 5, assuming that the board is the board 1, when the board 1 now needs to perform transmit channel correction with the upper level board N3, in step S612, a correction calculation unit 27 of the board 1 receives, from the cascade port 51 conducted by the switch unit 53, the coupled transmitter radio frequency signals of the upper level board N3 by using a correction transceiver 26 of the board 1; and the correction calculation unit 27 of the board 1 calculates the amplitude difference, the phase difference and the delay difference between the transmit channel of the board 1 and the transmit channel of the upper level board N3.

Step S613: The board corrects the transmit channel of the board according to a calculation result, so as to enable an amplitude, a phase and a delay of the transmit channel of the board to keep consistent with an amplitude, a phase and a delay of the transmit channel of the upper level or lower level board.

In specific implementation, in step S613, a baseband unit of the board corrects the transmit channel of the board according to the calculation result, so as to enable the amplitude, the phase and the delay of the transmit channel of the board to keep consistent with the amplitude, the phase and the delay of the transmit channel of the upper level or lower level board. Still referring to FIG. 4 and FIG. 5, assuming that the board is the board 1, when the board 1 now needs to perform transmit channel correction with the upper level board N3, in step S613, a baseband unit 20 of the board 1 corrects the transmit channel of the board 1 according to a calculation result of the correction calculation unit 27, so as to enable an amplitude, a phase and a delay of the transmit channel of the board 1 to keep consistent with an amplitude, a phase and a delay of the transmit channel of the upper level board N3.

Figure 7:
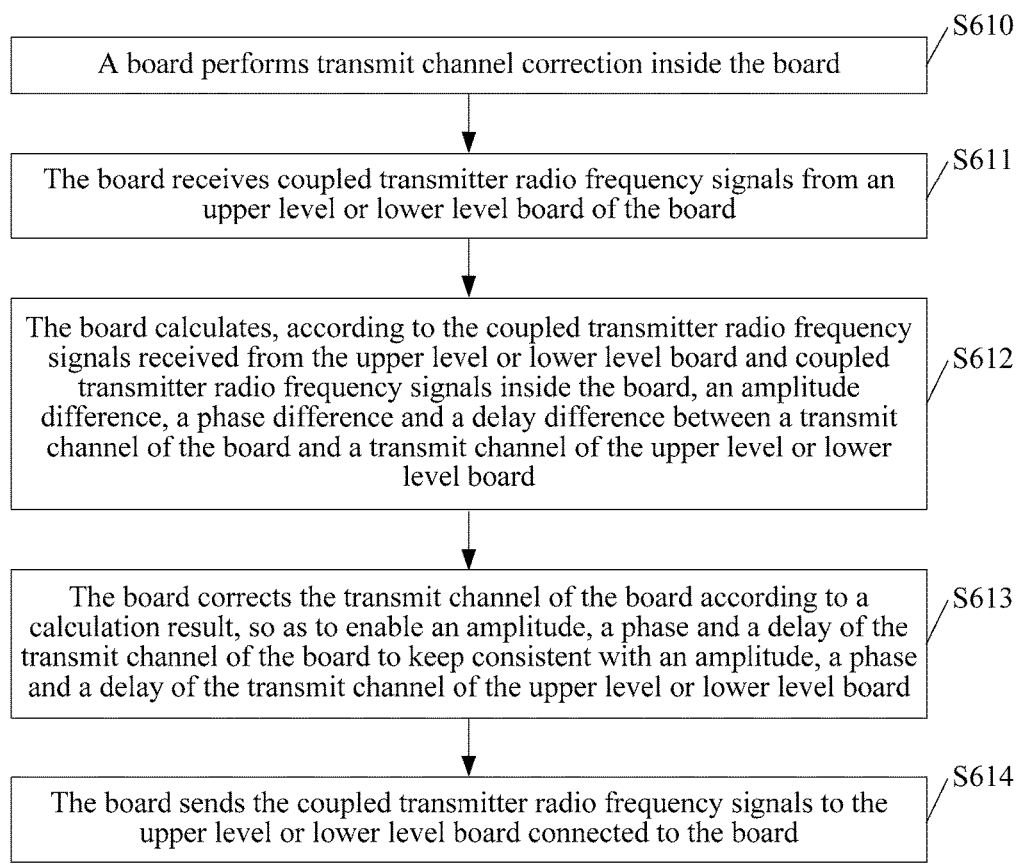
FIG. 7 is a schematic flowchart of another embodiment of a method for transmit channel correction between boards according to the present disclosure.

It should be noted that only a correction process of transmit channels between two cascaded boards in the ring-shaped architecture in FIG. 4 is described in FIG. 6. In specific implementation, when transmit channels of every two boards are corrected in sequence along a cascade direction of the ring-shaped architecture. In this way, it can be finally ensured that amplitudes, phases and delays of transmit channels of all boards in the entire ring-shaped architecture keep consistent. Specifically, referring to FIG. 7, after step S613, the method further includes:

Step S614: The board sends the coupled transmitter radio frequency signals to the upper level or lower level board connected to the board.

It should be noted that if in step S611, the board receives the coupled transmitter radio frequency signals from the upper level board, in step S614, the coupled transmitter radio frequency signals are sent to the lower level board; while if in step S611, the board receives the coupled transmitter radio frequency signals from the lower level board, in step S614, the coupled transmitter radio frequency signals are transmitted to the upper level board.

In specific implementation, in step S614, the switch unit of the board conducts the path on which the cascade port, cascaded to the upper level or lower level board, of the board is located, and sends the coupled transmitter radio frequency signals of the board to the upper level or lower level board by using the conducted cascade port. Still referring to FIG. 4 and FIG. 5, assuming that the board is the board 1, when the board 1 needs to perform transmit channel correction with the upper level board N3 in step S613, in step S614, the switch unit 53 of the board 1 conducts a path on which a cascade port 52, cascaded to a lower level board 2, of the board 1 is located, and transmits the coupled transmitter radio frequency signals to the lower level board 2 by using the conducted cascade port 52.

According to the foregoing direction of transmit channel correction, after the boards in FIG. 4 perform correction in sequence according to the following correction direction, it can be ensured that amplitudes, phases and delays of transmit channels of all boards in the entire ring-shaped architecture keep consistent. The correction manner may be: completing transmit channel correction of the board 1 by using a transmit channel of a board N3 as a standard; then, completing transmit channel correction of a board 2 by using a transmit channel of the board 1 as a standard; then, completing transmit channel correction of a board 3 by using a transmit channel of the board 2 as a standard; then, completing transmit channel correction of a board N1 by using a transmit channel of the board 3 as a standard; and then, completing transmit channel correction of a board N2 by using a transmit channel of the board N1 as a standard. Certainly, in specific implementation, a direction of transmit channel correction between boards may start from any board, and examples are not described one by one herein.

Figure 8:
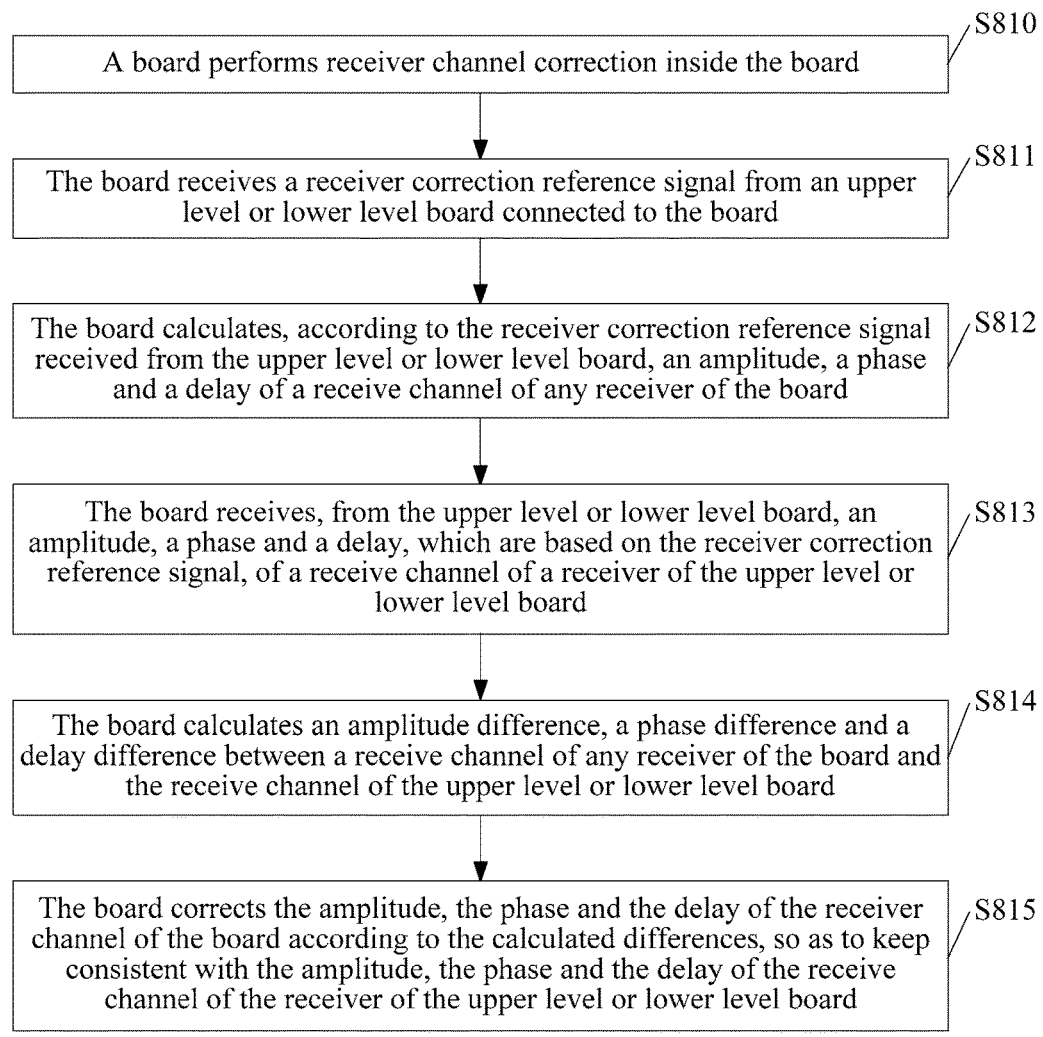
FIG. 8 is a schematic flowchart of an embodiment of a method for receive channel correction between boards according to the present disclosure.

Further, as shown in FIG. 8, based on architectures of FIG. 4 and FIG. 5, an embodiment of the present disclosure provides a method for receive channel correction between boards, where the method may be applied to receive channel correction between any board in the wireless communications system in FIG. 4 and an upper level or lower level board of the board. As shown in FIG. 8, the method may include:

Step S810: The board performs receiver channel correction inside the board.

For a process in which the board performs receive channel correction inside the board, refer to word descriptions of the embodiment of FIG. 2 and step S311 in FIG. 3, and no further details are provided herein again.

Step S811: The board receives a receiver correction reference signal from an upper level or lower level board connected to the board.

In specific implementation, in step S811, a switch unit inside the board conducts a path on which a cascade port, cascaded to the upper level or lower level board, of the board is located, and receives the receiver correction reference signal from the upper level or lower level board by using the conducted cascade port. For example, referring to FIG. 4 and FIG. 5, assuming that the board is a board 1, when the board 1 now needs to perform receive channel correction with an upper level board N3, in step S811, a switch unit 53 of the board 1 may conduct a cascade port 51, cascaded to the upper level board N3, of the board 1, and receive the receiver correction reference signal from the upper level board N3 by using the conducted cascade port 51.

Step S812: The board calculates, according to the receiver correction reference signal received from the upper level or lower level board, an amplitude, a phase and a delay of a receive channel of any receiver of the board.

In specific implementation, in step S812, a correction calculation unit of the board calculates, according to the receiver correction reference signal, which is received from the upper level or lower level board, received by a baseband unit of the board from any receiver of the board after being coupled, the amplitude, the phase and the delay of the receiver channel of the board. Still referring to FIG. 4 and FIG. 5, assuming that the board is the board 1, in step S612, a correction calculation unit 27 of the board 1 calculates, according to coupled receiver correction reference signals received by a baseband unit 26 of the board 1 from any receiver 23 of the board 1, the amplitude, the phase and the delay of the receiver channel of the board 1, where the receiver correction reference signals are received from the upper level board N3.

Step S813: The board receives, from the upper level or lower level board, an amplitude, a phase and a delay, which are based on the receiver correction reference signal, of a receive channel of a receiver of the upper level or lower level board.

In specific implementation, in step S813, the board receives, from the upper level or lower level board by using the central data processing unit, the amplitude, the phase and the delay, which are based on the receiver correction reference signal, of the receiver channel of the upper level or lower level board. Still referring to FIG. 4 and FIG. 5, assuming that the board is the board 1, in step S813, the board 1 receives, from the upper level board N3 by using the central data processing unit 41, the amplitude, the phase and the delay, which are based on the receiver reference correction signal of the upper level board N3, of the receiver channel of the upper level board N3.

Step S814: The board calculates an amplitude difference, a phase difference and a delay difference between a receive channel of any receiver of the board and the receive channel of the upper level or lower level board.

In specific implementation, in step S814, the correction calculation unit of the board calculates the amplitude difference, the phase difference and the delay difference between the receive channel of any receiver of the board and the receive channel of the upper level or lower level board. Still referring to FIG. 4 and FIG. 5, assuming that the board is the board 1, in step S814, the correction calculation unit 27 of the board 1 calculates an amplitude difference, a phase difference and a delay difference, which are calculated based on the receiver correction reference signal of the upper level board N3, between a receive channel of any receiver of the board 1 and the receive channel of the upper level board N3.

Step S815: The board corrects the amplitude, the phase and the delay of the receiver channel of the board according to the calculated differences, so as to keep consistent with the amplitude, the phase and the delay of the receive channel of the receiver of the upper level or lower level board.

In specific implementation, in step S815, the baseband unit of the board corrects the amplitude, the phase and the delay of the receiver channel of the board according to the calculated differences, so as to keep consistent with the amplitude, the phase and the delay of the receive channel of the receiver of the upper level or lower level board. Still referring to FIG. 4 and FIG. 5, assuming that the board is the board 1, in step S815, the baseband unit 20 of the board 1 corrects the amplitude, the phase and the delay of the receiver channel of the board 1 according to the calculated differences, so as to keep consistent with the amplitude, the phase and the delay of the receive channel of the receiver of the upper level board N3.

Figure 9:
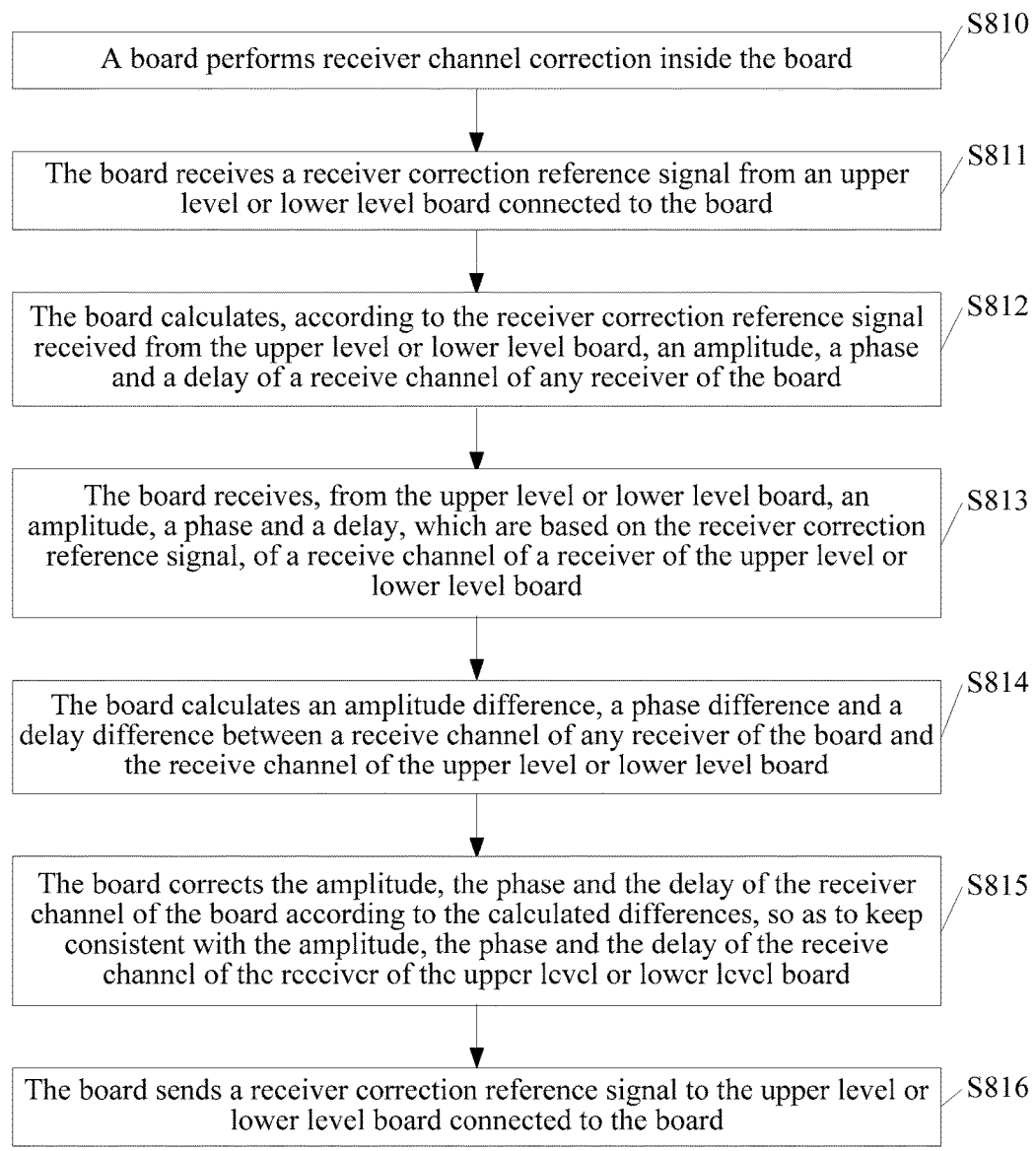
FIG. 9 is a schematic flowchart of another embodiment of a method for receive channel correction between boards according to the present disclosure.

It should be noted that only a correction process of receive channels between two cascaded boards in the ring-shaped architecture in FIG. 4 is described in FIG. 8. In specific implementation, when receive channels of every two boards are corrected in sequence along a cascade direction of the ring-shaped architecture, in this way, it can be finally ensured that amplitudes, phases and delays of receive channels of all boards in the entire ring-shaped architecture keep consistent. Specifically, referring to FIG. 9, after step S815, the method further includes:

Step S816: The board sends a receiver correction reference signal to the upper level or lower level board connected to the board.

In specific implementation, in step S816, a switch unit of the board conducts a path on which a cascade port, cascaded to the upper level or lower level board, of the board is located, and sends the receiver correction reference signal to the upper level or lower level board by using the conducted cascade port. It should be noted that if in step S811, the board receives coupled receiver correction reference signals from an upper level board, in step S816, the receiver correction reference signal is sent to a lower level board; while if in step S811, the board receives coupled receiver correction reference signals from a lower level board, in step S816, the coupled receiver correction reference signal is transmitted to an upper level board. Still referring to FIG. 4 and FIG. 5, assuming that the board is the board 1, when the board 1 performs receive channel correction with the upper level board N3 in step S815, in step S816, the switch unit 53 of the board 1 conducts a path on which a cascade port 52, cascaded to a lower level board 2, of the board 1 is located, and transmits the coupled receiver correction reference signal to the lower level board 2 by using the conducted cascade port 52.

According to the foregoing direction of transmit channel correction, after the boards in FIG. 4 perform correction in sequence according to the following correction direction, it can be ensured that amplitudes, phases and delays of receive channels of all boards in the entire ring-shaped architecture keep consistent. The correction manner may be: completing receive channel correction of the board 1 by using a receive channel of a board N3 as a standard; then, completing receive channel correction of a board 2 by using a receive channel of the board 1 as a standard; then, completing receive channel correction of a board 3 by using a receive channel of the board 2 as a standard; then, completing receive channel correction of a board N1 by using a receive channel of the board 3 as a standard; and then, completing receive channel correction of a board N2 by using a receive channel of the board N1 as a standard. Certainly, in specific implementation, a direction of receive channel correction between boards may start from any board, and examples are not described one by one herein.

Similarly, when transmit channel correction and receive channel correction between the boards in FIG. 4 are completed, a transmit channel of a board is randomly selected and a receive channel of another board is randomly selected, an amplitude difference, a phase difference and a delay difference between the transmit channel and the receive channel are calculated, a calculation result is transmitted to a central data processing unit, and the central data processing unit performs reciprocity correction of receive channels and transmit channels of the boards in the system in a unified way.

It can be known from FIG. 4 to FIG. 9 that, when the ring-shaped architecture of the embodiments of the present disclosure is used, at most two cascade ports only need to be led out between boards in a wireless communications system so as to be interconnected to other boards, and a correction signal may be transmitted between the boards by using cascade ports to complete transmit channel correction, receive channel correction and transmit channel and receive channel reciprocity correction between the boards; therefore, a common correction transceiver does not need to be used anymore, and a large quantity of cable connection between the boards and the common correction transceiver is not needed either, thereby greatly reducing costs and volumes of devices. Moreover, a circuit structure of each board is completely the same, so that it is ensured that losses, phase shifts and delays introduced on paths of receive and transmit correction between boards are reciprocal; besides, both receive/receive channels and transmit/transmit channels between two adjacent boards are corrected independently, and alignment is kept, and therefore a result of reciprocity correction between boards performed on such basis is also accurate.

In specific implementation, the present disclosure further provides a computer storage medium. The computer storage medium may store a program. Execution of the program may include some or all steps in the embodiments of the methods provided in the present disclosure. The foregoing storage medium may include: a magnetic disk, an optical disc, a read-only memory (Read-Only Memory, ROM), or a random access memory (Random Access Memory, RAM).

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection/disconnection may be appropriately defined as a computer-readable medium. For example, if software is transmitted from a web site, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present disclosure includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A board, comprising:
a baseband unit;
multiple transmitters;
multiple receivers;
a multi-antenna array;
a correction transceiver;
a correction calculation unit;
a bidirectional coupler configured to:
couple radio frequency signals output by the multiple transmitters and then transmit the coupled radio frequency signals to a combiner-splitter,
couple receiver correction reference signals obtained by performing division by the combiner-splitter, and
send the coupled receiver correction reference signals to the multiple receivers; and
a combiner-splitter configured to:
combine transmitter radio frequency signals coupled by the bidirectional coupler,
transmit the combined transmitter radio frequency signals to the correction transceiver, and to
divide a receiver correction reference signal sent by the correction transceiver, and
send receiver correction reference signals obtained by performing division to the bidirectional coupler, wherein
the bidirectional coupler is separately connected to the multiple transmitters, the multiple receivers and the combiner-splitter, and
the combiner-splitter is separately connected to the bidirectional coupler and the correction transceiver.

2. The board according to claim 1, further comprising:
a service data interface, configured to connect the board and a central data processing unit; and
a cascade port, configured to cascade the board and other boards on the central data processing unit to form a ring-shaped topology.

3. The board according to claim 2, wherein the cascade port comprises:
two cascade ports, separately connected to cascade ports of an upper level board and a lower level board in the ring-shaped topology; and
the board further comprises:
a switch unit, configured to:
control connection/disconnection of a path between the combiner-splitter and the correction transceiver,
control connection/disconnection of a cascade port, cascaded to the upper level board, of the board, wherein the cascade port cascaded to the upper level board is configured to send a receiver reference correction signal to the upper level board or to receive a transmitter radio frequency signal from the upper level board, and control connection/disconnection of a cascade port, cascaded to the lower level board, of the board, wherein the cascade port cascaded to the lower level board is configured to send a transmitter radio frequency signal of the board to the lower level board or to receive a receiver reference correction signal from the lower level board.

4. The board according to claim 3, wherein the two cascade ports are connected to the cascade ports of the upper level board and the lower level board by using a radio frequency cable.

5. A wireless communications system, comprising a central data processing unit and at least one board connected to the central data processing unit, wherein the at least one board is the board according to claim 1, and the at least one board performs data communication with the central data processing unit by using a service data interface.

6. A method for channel correction inside a board, comprising:
calculating, by a correction calculation unit, according to coupled transmitter radio frequency signals, an amplitude difference, a phase difference and a delay difference between transmit channels of multiple transmitters inside the board, and sending a calculation result to a baseband unit inside the board to perform transmit channel correction inside the board, wherein the coupled transmitter radio frequency signal is a signal that arrives at the correction calculation unit after radio frequency signals output by the multiple transmitters of the board are successively coupled by the bidirectional coupler, combined by the combiner-splitter, and forwarded by the correction transceiver;

calculating, by the correction calculation unit, according to coupled receiver reference correction signals, an amplitude difference, a phase difference and a delay difference between receive channels of multiple receivers inside the board, and sending a calculation result to the baseband unit to perform receive channel correction inside the board, wherein the coupled receiver reference correction signal is a signal that is output by the multiple receivers after a reference correction signal output by the correction transceiver inside the board is successively divided by the combiner-splitter, and coupled by the bidirectional coupler; and when the transmit channel correction and the receive channel correction are completed, calculating, by the correction calculation unit, an amplitude difference, a phase difference and a delay difference between channels of any transmitter and any receiver, and sending a calculation result to the baseband unit to perform channel reciprocity correction of the transmitter and the receiver inside the board.

7. A method for transmit channel correction between boards in a wireless communications system, wherein the wireless communications system comprises a central data processing unit and at least one board connected to the central data processing unit, the board performs data communication with the central data processing unit by using a service data interface, and the method comprises:

performing, by each of the boards, transmit channel correction inside each board;

receiving, by the board, coupled transmitter radio frequency signals from an upper level or lower level board of the board;

calculating, by the board according to the coupled transmitter radio frequency signal received from the upper level or lower level board and coupled transmitter radio frequency signals inside the board, an amplitude difference, a phase difference and a delay difference between a transmit channel of the board and a transmit channel of the upper level or lower level board; and correcting, by the board, the transmit channel of the board according to a calculation result, so as to enable an amplitude, a phase and a delay of the transmit channel of the board to keep consistent with an amplitude, a phase and a delay of the transmit channel of the upper level or lower level board respectively.

8. The method for transmit channel correction between boards according to claim 7, wherein the receiving, by the board, coupled transmitter radio frequency signals from an upper level or lower level board of the board comprises:

conducting, by a switch unit inside the board, a path on which a cascade port, cascaded to the upper level or lower level board, of the board is located, and receiving the coupled transmitter radio frequency signal from the upper level or lower level board by using the conducted cascade port.

9. The method for transmit channel correction between boards according to claim 8, wherein the calculating, by the board according to the coupled transmitter radio frequency signal received from the upper level or lower level board and coupled transmitter radio frequency signals inside the board, an amplitude difference, a phase difference and a delay difference between a transmit channel of the board and a transmit channel of the upper level or lower level board comprises:

receiving, by a correction calculation unit of the board from the cascade port conducted by the switch unit, the coupled transmitter radio frequency signal of the upper level or lower level board by using a correction transceiver of the board; and calculating, by the correction calculation unit of the board, the amplitude difference, the phase difference and the delay difference between the transmit channel of the board and the transmit channel of the upper level or lower level board.

10. The method for transmit channel correction between boards according to claim 9, wherein the correcting, by the board, the transmit channel of the board according to a calculation result comprises:

correcting, by a baseband unit of the board, the transmit channel of the board according to the calculation result of the correction calculation unit of the board.

11. The method for transmit channel correction between boards according to claim 7, after the correcting, by the board, the transmit channel of the board according to a calculation result, further comprising:

sending, by the board, the coupled transmitter radio frequency signals to the upper level or lower level board connected to the board.

12. The method for transmitter channel correction between boards according to claim 11, wherein the sending, by the board, coupled transmitter radio frequency signals to the upper level or lower level board connected to the board comprises:

conducting, by the switch unit of the board, the path on which the cascade port, cascaded to the upper level or lower level board, of the board is located, and sending the coupled transmitter radio frequency signal of the board to the upper level or lower level board by using the conducted cascade port.

13. A method for receive channel correction between boards in a wireless communications system, wherein the wireless communications system comprises a central data processing unit and at least one board connected to the central data processing unit, the board performs data communication with the central data processing unit by using a service data interface, and the method comprises:

performing, by each of the boards, receiver channel correction inside each board;

receiving, by the board, a receiver correction reference signal from an upper level or lower level board connected to the board;

calculating, by the board according to the receiver correction reference signal received from the upper level or lower level board, an amplitude, a phase and a delay of a receive channel of any receiver of the board;

receiving, by the board from the upper level or lower level board, an amplitude, a phase and a delay, which are based on the receiver correction reference signal, of a receive channel of a receiver of the upper level or lower level board;

calculating, by the board, an amplitude difference, a phase difference and a delay difference between a receive channel of any receiver of the board and the receive channel of the upper level or lower level board; and correcting, by the board, the amplitude, the phase and the delay of the receiver channel of the board according to the calculated differences, so as to keep consistent with the amplitude, the phase and the delay of the receive channel of the receiver of the upper level or lower level board.

14. The method for receive channel correction between boards according to claim 13, wherein the receiving, by the board, a receiver correction reference signal from an upper level or lower level board connected to the board comprises:

conducting, by a switch unit inside the board, a path on which a cascade port, cascaded to the upper level or lower level board, of the board is located, and receiving the receiver correction reference signal from the upper level or lower level board by using the conducted cascade port.

15. The method for receive channel correction between boards according to claim 14, the calculating, by the board according to the receiver correction reference signal received from the upper level or lower level board, an amplitude, a phase and a delay of a receive channel of any receiver of the board comprises:

calculating, by a correction calculation unit of the board according to coupled receiver correction reference signals received by a baseband unit of the board from any receiver of the board, the amplitude, the phase and the delay of the receiver channel of the board, wherein the receiver correction reference signals are received from the upper level or lower level board.

16. The method for receive channel correction between boards according to claim 15, wherein the receiving, by the board from the upper level or lower level board, an amplitude, a phase and a delay, which are based on the receiver correction reference signal, of a receive channel of a receiver of the upper level or lower level board comprises:

receiving, by the board from the upper level or lower level board by using the central data processing unit, the amplitude, the phase and the delay, which are based on the receiver correction reference signal, of the receiver channel of the upper level or lower level board.

17. The method for receive channel correction between boards according to claim 16, wherein the calculating, by the board, an amplitude difference, a phase difference and a delay difference between a receive channel of any receiver of the board and the receive channel of the upper level or lower level board comprises:

calculating, by the correction calculation unit of the board, the amplitude difference, the phase difference and the delay difference between the receive channel of any receiver of the board and the receive channel of the upper level or lower level board.

18. The method for receive channel correction between boards according to claim 17, wherein the correcting, by the board, the amplitude, the phase and the delay of the receiver channel of the board according to the calculated differences, so as to keep consistent with the amplitude, the phase and the delay of the receive channel of the receiver of the upper level or lower level board comprises:

correcting, by the baseband unit of the board, the amplitude, the phase and the delay of the receiver channel of the board according to the calculated differences, so as to keep consistent with the amplitude, the phase and the delay of the receive channel of the receiver of the upper level or lower level board.

19. The method for receive channel correction between boards according to claim 13, after the correcting, by the board, the amplitude, the phase and the delay of the receiver channel of the board according to the calculated differences, further comprising:

sending, by the board, a receiver correction reference signal to the upper level or lower level board connected to the board.

20. The method for receive channel correction between boards according to claim 19, wherein the sending, by the board, a receiver correction reference signal to the upper level or lower level board connected to the board comprises:

conducting, by the switch unit of the board, the path on which the cascade port, cascaded to the upper level or lower level board, of the board is located, and sending the receiver correction reference signal to the upper level or lower level board by using the conducted cascade port.

* * * * *